United States Patent
Watanabe

(10) Patent No.: US 6,295,915 B1
(45) Date of Patent: Oct. 2, 2001

(54) BRAKE BOOSTER

(75) Inventor: Makoto Watanabe, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/385,948

(22) Filed: Aug. 30, 1999

(30) Foreign Application Priority Data

Oct. 2, 1998 (JP) .................................................. 10-281188

(51) Int. Cl.$^7$ .......................................................... F15B 9/10
(52) U.S. Cl. ............................................................. 91/369.2
(58) Field of Search ............................................ 91/369.2

(56) References Cited

U.S. PATENT DOCUMENTS

| | | | |
|---|---|---|---|
| Re. 26,487 | * | 11/1968 | French .................................. 91/369.2 |
| 4,898,073 | * | 2/1990 | Seip et al. ............................. 91/369.2 |
| 5,697,284 | | 12/1997 | Ikeda . |
| 5,794,506 | * | 8/1998 | Inoue et al. ........................... 91/369.2 |
| 5,893,316 | * | 4/1999 | Inoue et al. ........................... 91/369.2 |
| 6,006,649 | * | 12/1999 | Parker et al. ......................... 91/369.2 |
| 6,135,007 | * | 10/2000 | Tsubouchi ............................. 91/369.2 |
| 6,186,042 | * | 2/2001 | Levrai et al. ......................... 91/369.2 |
| 6,192,783 | * | 2/2001 | Tobisawa .............................. 91/369.2 |
| 6,205,905 | * | 3/2001 | Satoh et al. .......................... 91/369.2 |
| 6,209,441 | * | 4/2001 | Takaku et al. ....................... 91/369.2 |
| 6,212,992 | * | 4/2001 | Tsubouchi et al. .................. 91/369.2 |

FOREIGN PATENT DOCUMENTS 8-113137   5/1996   (JP) .

* cited by examiner

Primary Examiner—John Ryznic
(74) Attorney, Agent, or Firm—Flynn, Thiel, Boutell & Tanis, P.C.

(57) ABSTRACT

According to the invention, a servo ratio regulating member is disposed on the front end face of the valve body for abutment against the rear end face of a reaction disc. The servo ratio regulating member comprises an engaging portion which is engaged with a portion of a reduced diameter formed on the front end face of the valve body, and an abutment portion continuing from the engaging portion and projecting forwardly for abutment against the reaction disc. An external diameter D" of the abutment portion as well as an external diameter of the reaction disc which is seated thereon are greater than an external diameter D of the outer periphery of the valve element, reducing the proportion of a brake reaction which is transmitted to a driver. With this arrangement, a higher servo ratio can be established with an arrangement which is simplified and inexpensive as compared with the prior art.

12 Claims, 4 Drawing Sheets

BRAKE BOOSTER

FIELD OF THE INVENTION

The invention relates to a brake booster, and more particularly, to a brake booster which is provided with a reaction disc.

DESCRIPTION OF THE PRIOR ART

A brake booster which allows an input to be reduced at the commencement of operation is known in the art which comprises a substantially tubular valve body slidably disposed within a shell, a power piston mounted on the valve body to divide the interior of the shell into a constant pressure chamber and a variable pressure chamber, a valve plunger slidably disposed on the valve body and driven back and forth by an input shaft to switchably control a flow path, an output shaft slidably mounted on the valve body and adapted to be driven back and forth in interlocked relationship with the valve body, and a reaction disc interposed between the output shaft and the valve body and having a rear end which is disposed for abutment against the valve plunger, the valve mechanism comprising an annular, first valve seat formed on the valve body, a second valve seat formed on the rear end of the valve plunger, a valve element disposed within the valve body and adapted to be seated upon the first and the second valve seat under the resilience of a poppet return spring, and a valve return spring for maintaining the valve plunger, input shaft and the valve element in their inoperative positions, an atmosphere valve being formed by a combination of the first valve seat and a first seat area on the valve element which becomes seated thereon, and a vacuum valve being formed by a combination of the second valve seat and a second seat area on the valve element which becomes seated thereon, the atmosphere valve and the vacuum valve being spaced apart axially with the diameter of the vacuum valve being reduced to the same order as the atmosphere valve (see Japanese Laid-Open Patent Application No. 113,137/1996).

With a brake booster of the kind described above, because the diameter of the vacuum valve is reduced to the same order as the atmosphere valve, the pressure responsive area which is subject to a differential pressure acting upon the valve element when the booster is actuated where the valve element is seated upon the first valve seat can be increased as compared when the vacuum valve is disposed outward of the atmosphere valve, allowing the resilience which is required of the poppet return spring to urge the valve element forwardly into abutment against the both valve seats to maintain a hermetic seal to be reduced. As a consequence of this, it is possible to reduce an input to commence the operation as the input shaft is driven forward while causing a flexure of the poppet return spring.

A brake booster is recently proposed in which a brake reaction which is transmitted to a driver upon depression of a brake pedal is reduced to enable a quick braking by a less powerful driver such as a female or aged driver, but such a booster uniformly suffers from a complex arrangement and an increased cost.

To overcome such a problem, it is contemplated to reduce the internal diameter of the valve body while maintaining the external diameter thereof in the region where it abuts the reaction disc unchanged, and simultaneously reducing the external diameter of the plunger which is received in the valve body, thereby increasing a proportion of a reaction which is transmitted from the reaction disc to the valve body while decreasing the proportion of the brake reaction which is transmitted from the reaction disc to a driver through the valve plunger.

However, with this arrangement, a deforming force of a magnitude which is increased acts in a concentrated manner upon a central portion of the reaction disc which deforms and bulges into the valve body, producing a disadvantage that the durability of the reaction disc is impaired.

To establish a higher servo ratio without impairing the durability of the reaction disc, it is contemplated to increase the external diameter of the reaction disc together with the external diameter of an abutting portion of the valve body while maintaining the internal diameter of an abutting portion of the reaction disc unchanged, thus increasing the proportion of the brake reaction which is transmitted from the reaction disc to the valve body while decreasing the proportion of the brake reaction which is transmitted from the reaction disc to a driver through the valve plunger and the input shaft.

However, referring to FIG. 5, if it is attempted to increase the external diameter of an abutting portion 107G of a valve body 107, it will be noted that a constant pressure passage 133 which provides a communication between a space located radially outward of a first valve seat 116, which forms part of the atmosphere valve, and a constant pressure chamber A has an opening which opens into the front end face of the valve body 107, thus standing in the way of increasing the external diameter of the abutting portion 107 beyond a value D'.

This will be discussed in further detail below. The valve body 107 is integrally molded by a casting into an enclosed space defined by a front die including a passage die 180 which projects rearward as indicated by phantom lines and a rear die including a passage die 181 which projects forward as indicated by dotted lines, and the constant pressure passage 133 which provides a communication in the axial direction and any other passage are formed by an overlap or abutment between ends of the passage die 180 of the front die and ends of the passage die 181 of the rear die.

Accordingly, if it is desired to increase the diameter of the abutting portion 107G of the valve body 107, it is concomitantly necessary that the location of the constant pressure passage 133 be displaced radially outward. When so arranged, the constant pressure passage die 180' of the passage die 180 and the constant pressure passage die 180' of the passage die 181 which are used to form the constant pressure passage 133 must be disposed in close contact with each other without any clearance therebetween in the radial direction (while they are depicted as spaced from each other in FIG. 5, it should be understood that they are in close contact with each other in practice.). This requires that the internal diameter D of a tubular terminal portion 107A be increased.

However, when the internal diameter D of the tubular terminal portion 107A is increased, the diameter of the valve element which is clamped within the tubular terminal portion 107A must be increased, with consequence that a pressure responsive area which is subject to a differential pressure acting upon the valve element when the booster is inoperative increases. Consequently, a preset load on the valve return spring which is disposed between the valve body and the input shaft to maintain these members in their inoperative positions must be chosen to overcome a sum of the differential pressure acting upon the valve plunger, the differential pressure acting upon the valve element which is seated on the valve plunger and the resilience of the poppet return spring which urges the valve element forwardly, and this results in increasing an input which is required for commencing the operation.

SUMMARY OF THE INVENTION

In view of the foregoing, the invention provides a brake booster capable of establishing a servo ratio with a simple and inexpensive arrangement as compared with the prior art.

Specifically, the present invention relates to a brake booster including a substantially tubular valve body slidably disposed within a shell, a power piston mounted on the valve body to divide the interior of the shell into a constant pressure chamber and a variable pressure chamber, a valve plunger slidably mounted on the valve body and driven to move back and forth by an input shaft to switchably control a flow path, an output shaft slidably mounted on the valve body and driven back and forth in an interlocked relationship with the valve body, and a reaction disc disposed between the output shaft and the valve body for transmitting a brake reaction from the output shaft through the valve body and the valve plunger, the valve mechanism comprising an annular, first valve seat formed on the valve body, a second valve seat formed on a rear end of the valve plunger, and a valve element disposed within the valve body and adapted to be seated on the first valve seat and the second valve seat. In accordance with the invention, there is provided a servo ratio regulating member on the front end face of the valve body to project axially forward to abut against the rear end face of the reaction disc, the external diameters of the servo ratio regulating member and its abutted reaction disc being chosen to be greater than the external diameter of the outer periphery of the valve element which is clamped to the inner peripheral surface of the valve body.

With the described arrangement, the servo ratio regulating member which abuts against the reaction disc is formed separately from the valve body, whereby the external diameter of the servo ratio regulating member can be chosen to be greater than that of the constant pressure passage without being subject to any constraint by the latter. Accordingly, as compared with the prior art, the proportion of the brake reaction which is transmitted from the reaction disc to the valve body can be increased while decreasing the proportion of the brake reaction which is transmitted from the reaction disc to the valve plunger, thereby allowing a higher servo ratio to be established with a simplified and inexpensive arrangement as compared with the prior art.

Above and other objects, features and advantages of the invention will become apparent from the following description of an embodiment thereof with reference to the drawings.

DETAILED DESCRIPTION OF THE EMBODIMENTS

Figure 1:
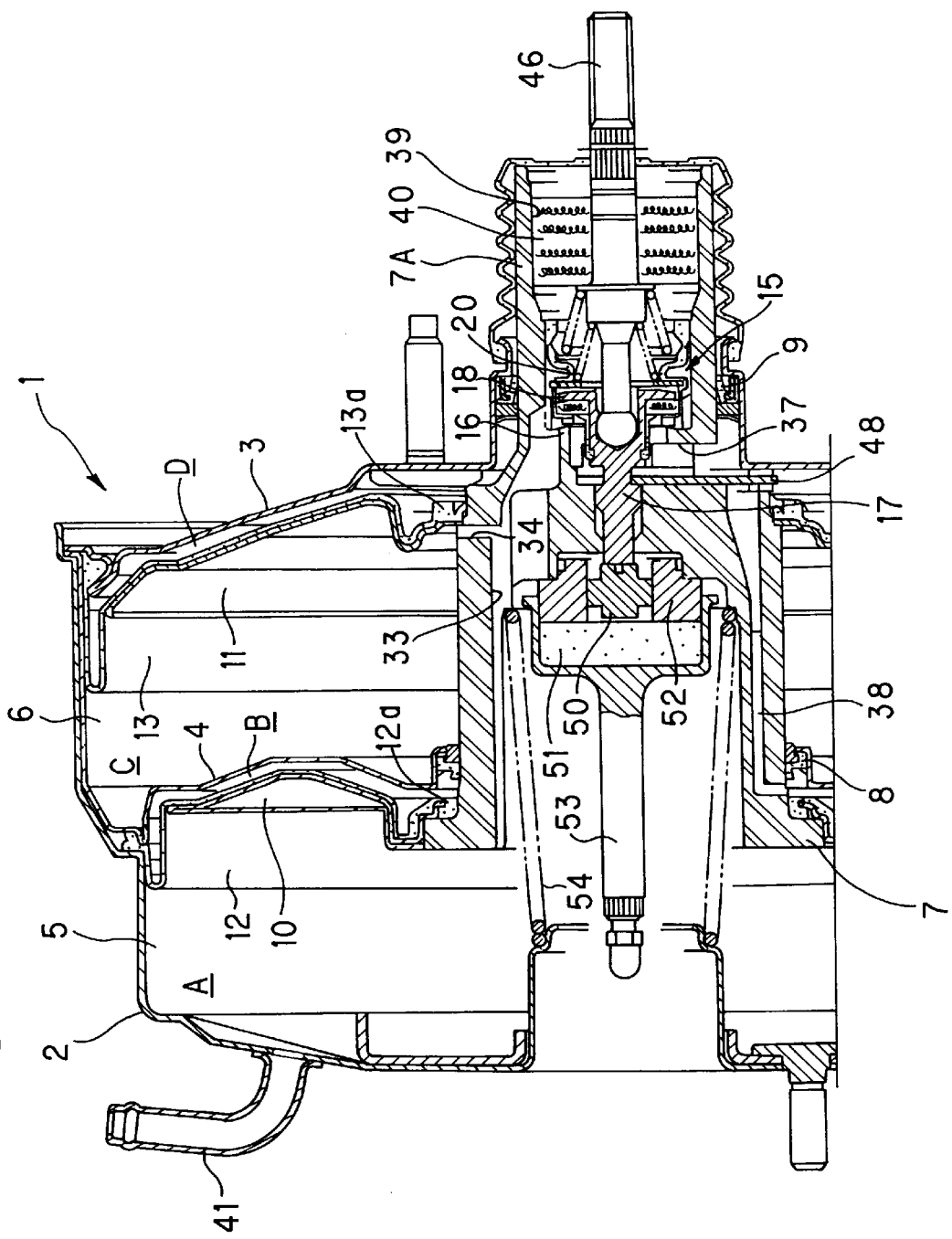
FIG. 1 is a cross section showing a first embodiment of the invention.

Referring to the drawings, the invention will now be described with respect to an embodiment thereof shown. In FIG. 1, a brake booster 1 of tandem type includes a front shell 2 and a rear shell 3, which defines an enclosed space, the interior of which is divided by a center plate 4 into a forwardly located, front chamber 5 and a rearwardly located, rear chamber 6. A tubular valve body 7 slidably extends through the rear shell 3 and the center plate 4 with seal means 8, 9 being provided to maintain a hermetic seal.

A front power piston 10 and a rear power piston 11 are mounted on the outer periphery of the valve body 7 at locations which lie within the front chamber 5 and the rear chamber 6, respectively, and a front diaphragm 12 and a rear diaphragm 13 are applied to the back surfaces of the respective power pistons 10 and 11. In this manner, a constant pressure chamber A and a variable pressure chamber B are defined across the front diaphragm 12 within the front chamber 5 while a constant pressure chamber C and a variable pressure chamber D are defined across the rear diaphragm 13 within the rear chamber 6.

Figure 3:
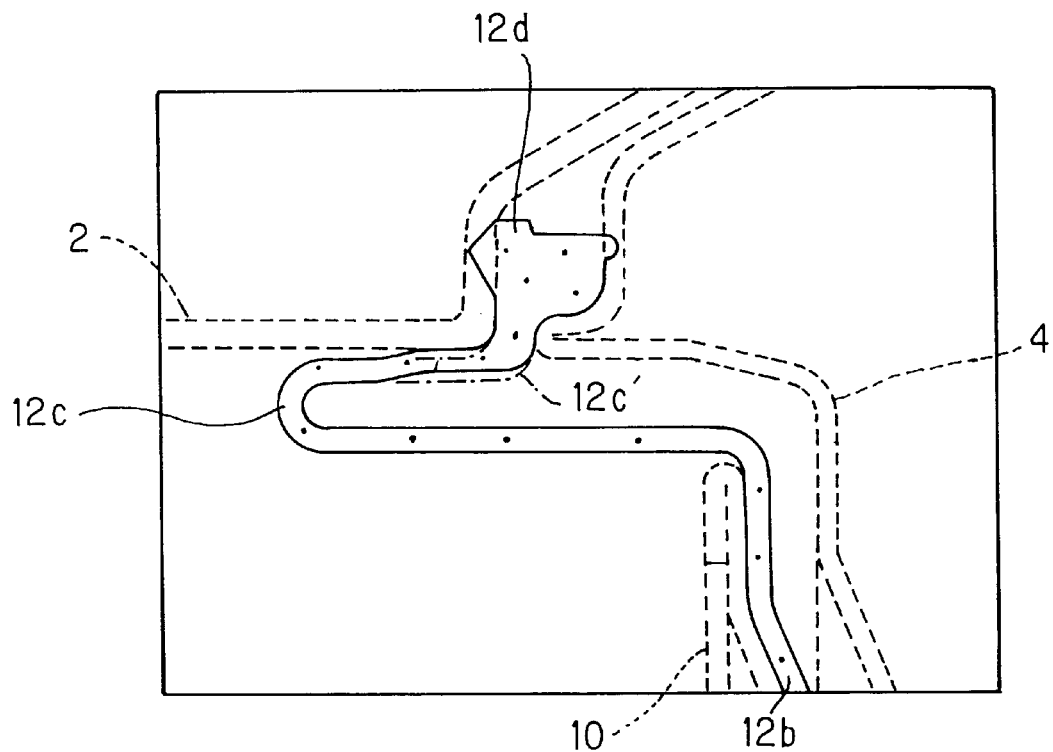
FIG. 3 is an enlarged cross section showing a rolling part 12c of a front diaphragm 12.

As shown in FIGS. 1 and 3, the front diaphragm 12 comprises an inner periphery bead 12a held sandwiched between the valve body 7 and the front power piston 10, a radial portion 12b of a reduced thickness continuing from the bead 12a, applied to the rear end face of the front power piston 10 and extending radially outward, a substantially U-shaped rolling part 12c continuing from the radial portion 12b and projecting forwardly through a space between the free end of the front shell 2 and the front power piston 10 and which is folded back radially and rearwardly, and an outer periphery bead 12d continuing from the outer periphery of the rolling part 12c and held between a step in the front shell 2 and a holder for the center plate 4.

The inner periphery bead 12a and the outer periphery bead 12d are formed to a sufficient wall thickness to prevent a withdrawal thereof, but the radial portion 12d and the rolling part 12c are formed to a reduced thickness in order to reduce the weight as well as a resistance to a rolling motion.

Figure 4:
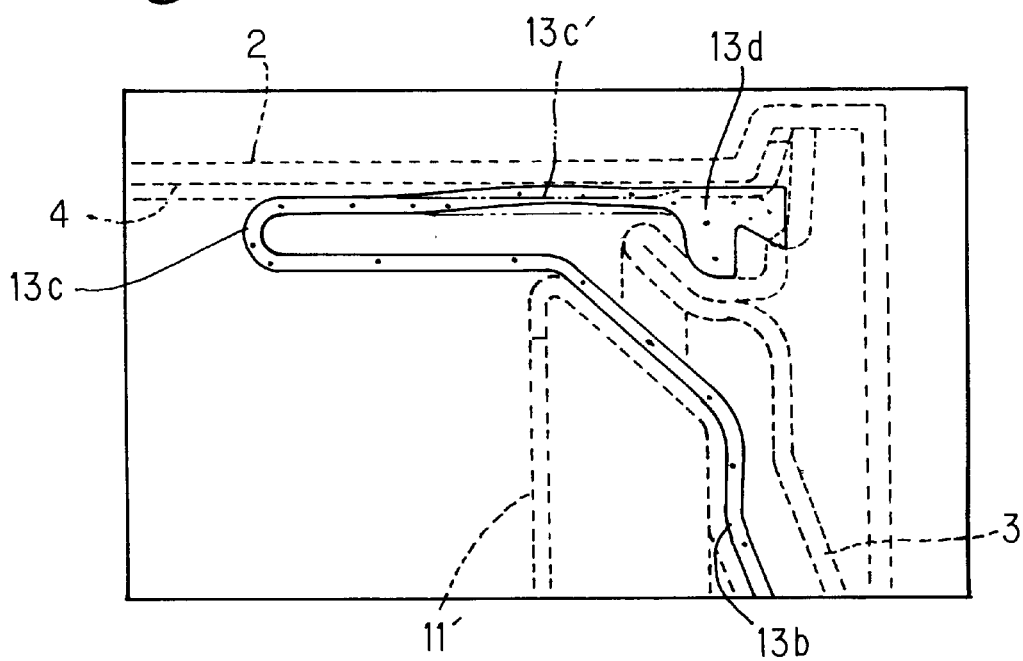
FIG. 4 is an enlarged cross section showing a rolling part 13c of a rear diaphragm 13.

As shown in FIGS. 1 and 4, the rear diaphragm 13 comprises an inner periphery bead 13a held sandwiched between the valve body 7 and the rear power piston 11, a radial portion 13b of a reduced wall thickness which extends from the inner periphery bead 13a and which is applied to the rear end face of the rear power piston 11 to extend radially outward, a substantially U-shaped rolling part 13c continuing from the radial portion 13b and projecting forwardly through a space between the front end of the rear power piston 11 and the center plate 4 and folded back radially and rearwardly, and an outer periphery bead 13d continuing from the outer periphery of the rolling part 13c and held sandwiched between the inner peripheral surface of the center plate 4 and the holder for the rear shell 3.

The inner periphery bead 13a and the outer periphery bead 13d are formed to a sufficient wall thickness to prevent a withdrawal thereof, but the radial portion 13b and the rolling part 13c are formed to a reduced thickness in order to reduce the resistance to the rolling motion.

To increase the stroke of the valve body 7 and the power pistons 10, 11, the axial size of the rolling parts 12c and 13c must be increased. However, an increased axial size of the rolling parts 12c and 13c results in a reduced strength of the molding die in a region corresponding to the rolling parts, causing a variation in the dimensional accuracy of the rolling parts 12c and 13c. This is because there is no increase in the radial thickness while the length of the die for the rolling parts increases.

To overcome the described problem, it may be contemplated to increase the radial size of the rolling parts together with an increase in the thickness of the die in its region corresponding to the rolling parts. However, if the rolling part is enlarged radially inward, the effective diameter of the diaphragm is reduced to decrease the output and also causes a likelihood that the free end of the rolling part may be entangled between the front shell and the front power piston during the rolling motion. On the other hand, if the rolling part is enlarged radially outward, the external diameter of the shell must be increased concomitantly, degrading its mountability on a vehicle and also causing a likelihood that the rolling part may be entangled between the front shell and the front power piston during the rolling motion.

To accommodate for this, in the present embodiment, outer periphery portions 12c', 13c' located toward the terminal ends of respective rolling parts 12c, 13c are formed to bulge radially outward in comparison to the front ends of the rolling parts, as indicated in solid line in FIGS. 3 and 4. More specifically, according to the prior art, the rolling part has its front end and terminal end formed to an equal thickness, as indicated in phantom lines, but in the present embodiment, the front end which substantially rolls remains unchanged in thickness while only the terminal end is formed to a greater thickness, thereby allowing the strength of the die in the region of rolling parts to be enhanced in comparison to the prior art.

It should be noted that in its natural condition, the outer periphery portion 13c' of the rolling part 13 of the rear diaphragm 13 is formed to a diameter which is slightly greater than the center plate 4, but after the assembly, it is deformed in conformity to the inner peripheral surface of the center plate 4, as shown in FIG. 1, producing no wrinkles. Accordingly, the rolling parts 12c and 13c of the both diaphragms 12 and 13 can be formed with a good dimensional accuracy as compared with the prior art.

Figure 2:
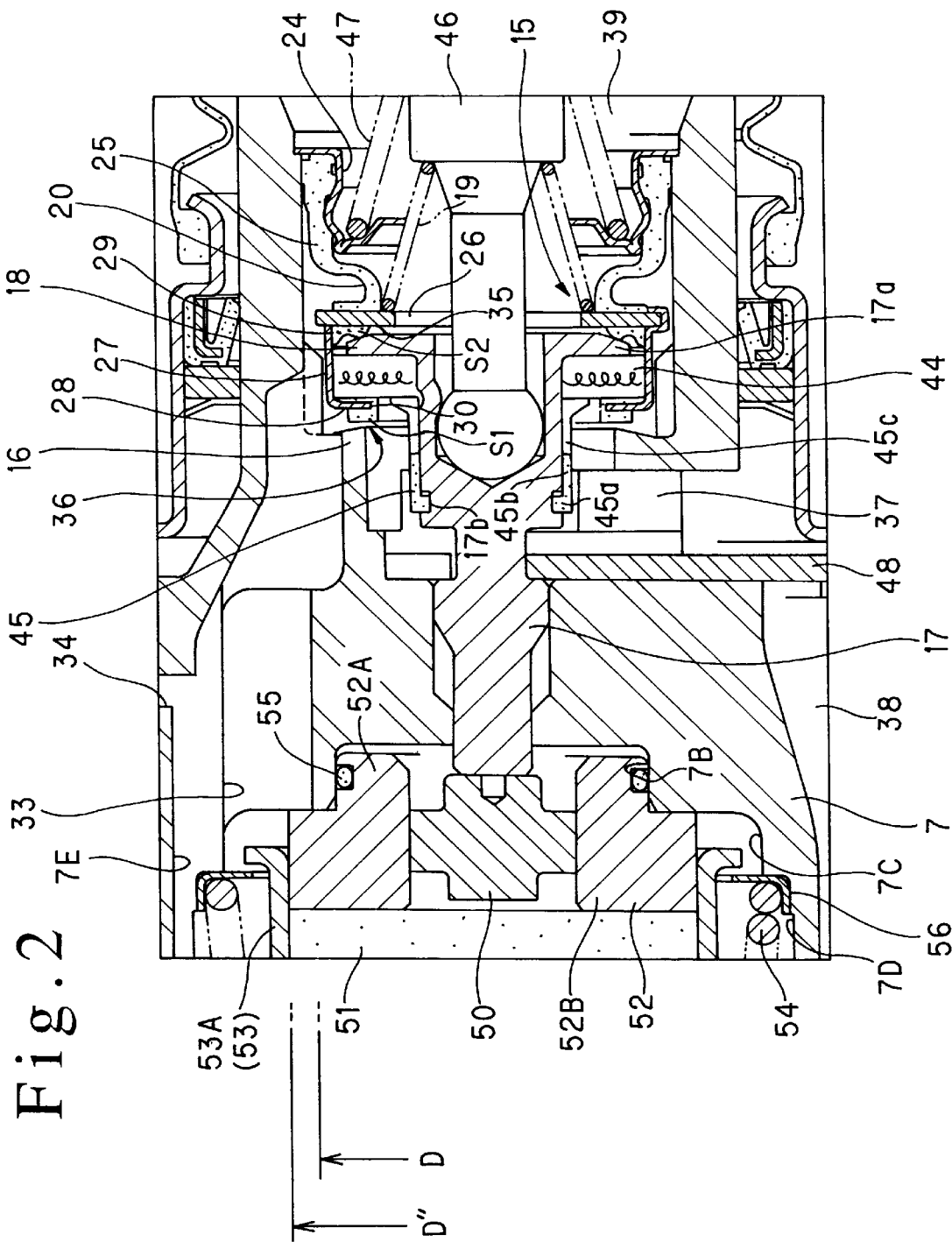
FIG. 2 is an enlarged cross section showing part shown in FIG. 1.

A valve mechanism 15 which switches a communication between the constant pressure chambers A, C and the variable pressure chambers B, D is disposed within the valve body 7. As shown in FIG. 2, the valve mechanism 15 comprises an annular first valve seat 16 formed on the valve body 7 and extending rearward, a valve plunger 17 slidably mounted within the valve body 7, an annular second valve seat 18 formed on a rear end of the valve plunger 17 which is located rearward of the first valve seat 16, and a valve element 20 including a first seat area S1 and a second seat area S2 which are adapted to be seated on the first valve seat 16 and the second valve seat 18, respectively, as it is urged forwardly by a poppet return spring 19.

The valve element 20 which is adapted to be seated on the first valve seat 16 and second valve seat 18 which are disposed seriatim axially comprises a rolling part 25 formed of an elastic material and which has its base end held sandwiched between the inner peripheral surface of the valve body 7 and the outer peripheral surface of a retainer 24 which is fitted into the valve body 7, a backup plate 26 continuing from the front end of the rolling part 25, a metal sleeve 27 having its rear end caulked to the outer periphery of the backup plate 26 and extending forwardly in surrounding relationship with the second valve seat 18, and another backup plate 28 continuing from the front end of the sleeve 27 and folded radially inward. A seat 29 provided on the front end face of the backup plate 26 defines a second seat area S2 while a seat 30 provided on the front end face of the other backup plate 28 defines a first seat S1. A spacing between the first seat S1 and the second seat S2 is chosen to be slightly greater than the spacing between the first valve seat 16 and the second valve seat 18.

In the inoperative condition shown, the second seat area S2 is seated upon the second valve seat 18 while the first seat area S1 is removed from the first valve seat 16, whereby a negative pressure is introduced into the variable pressure chamber B through constant pressure passages 33, 34 to be described later, whereby both the constant pressure chamber A and the variable pressure chamber B assume an equal pressure.

The valve mechanism 15 also comprises an axial constant pressure passage 33 formed within the valve body 7 for allowing communication of a space located radially outward of an atmosphere valve 35, formed by a combination of the first valve seat 16 and the first seat area S1 which becomes seated thereon, with the constant pressure chamber A, and a radial constant pressure passage 34 which provides a communication between the constant pressure passage 33 and the constant pressure chamber C.

The valve mechanism 15 additionally comprises a radial passage 37 which allows a communication of a space between a vacuum valve 36, formed by a combination of the second valve seat 19 and the second seat area S2 which becomes seated thereon, and the atmosphere valve 35 with the variable pressure chamber B and an axial variable pressure passage 38 communicating the variable pressure chambers B and D.

The valve mechanism 15 also comprises an atmosphere passage 39 which is formed within the tubular terminal portion 7A and which allows a communication of a space located radially inward of the vacuum valve 36 with the atmosphere, with a filter 40 disposed in the atmosphere passage 39. The constant pressure chamber A communicates with an intake manifold of an engine through a tubing 41 (see FIG. 1) mounted on the front shell 2 for introducing a negative pressure, whereby a negative pressure is normally introduced into the constant pressure chambers A and C.

A ring-shaped straightening vane member 44 which provides a fairing action to a flow of the atmosphere passing between the inner peripheral surface of the sleeve 27 and the outer peripheral surface of the valve plunger 17 is disposed therebetween, and is effective to prevent a turbulence from occurring in the atmosphere, thereby preventing the occurrence of abnormal sounds during the turbulent flow. The straightening vane member 44 is formed as a filter formed of soft resin, and its rear end face is disposed in abutment against a folder 17a of the valve plunger 17 which is folded back radially outward to prevent its disengagement in the rearward direction, while the front end face is disposed in abutment against the backup plate 28 which is folded radially inward and against a locking member 45 formed of an elastic material and disposed on the valve plunger 17 to prevent the disengagement of the vane member 44 in the forward direction.

The locking member 45 comprises an anchorage 45a of an increased thickness which is fitted into an annular groove 17b formed in the outer peripheral surface of the valve plunger 17 and secured therein, a tubular portion 45b continuing from the anchorage 45a and extending rearward in close contact with the outer peripheral surface of the valve plunger 17, and a plurality of supports 45c extending rearward from the front end face of the tubular portion 45b at a plurality of points which are circumferentially spaced apart at an equal interval and abutting against the inside of the front end face of the vane member 44, allowing an increase in the amount of the inflow of the atmosphere as compared with an arrangement in which the tubular portion 45b is directly extended until it abuts against the vane member 44. The locking member 45 is formed of an elastic material in order to prevent an interference with the backup plate 28 which forms part of the valve element 20 and the seat 30 disposed thereon as the booster is actuated to cause a damage to either member.

With this arrangement, when the valve mechanism 15 is switched from the condition shown, the vane member 44 tends to be pushed forwardly by the atmosphere which passes therethrough, but cannot be disengaged because the front end face of the vane member 44 is held in place by the locking member 45.

In contrast to this arrangement of the present embodiment, in the prior art practice, an annular vane member is simply inserted into a tubular portion which opens forwardly, involving a likelihood that it may be disengaged in the forward direction in response to the inflow of the atmosphere when the booster is actuated. While this difficulty may be overcome by using a vane member having a high stiffness which is fitted into the tubular portion, in such instance, the vane member is less susceptible to deformation, resulting in a difficulty of caulking of the outer periphery of the valve plunger 17 when a spherical surface at the front end of an input shaft 46 is pivotally connected to the valve plunger 17. However, with the present embodiment, the use of a soft material is allowed while preventing a disengagement by the locking member 45, thus enabling a choice of an optimum material.

It is to be noted that in the present embodiment, as the valve plunger 17 is driven forward relative to the valve body 7, the vane member 44 may be compressed between the folder 17a of the valve plunger 17 and the backup plate 27 which is seated upon the first valve seat 16 on the valve body 7, but because the vane member 44 is formed of a soft material, there cannot result in an increase in the input which commences the operation. While the locking member 45 has been described as being formed of an elastic material, the invention is not limited thereto, and it may be formed of a soft resin material such as a plastic.

The right end of the valve plunger 17 is pivotally connected with the free end of the input shaft 46, which is urged rearward by a valve return spring 47 having a greater resilience than the poppet return spring 19, whereby the valve element 20 is normally seated upon the second valve seat 18 on the valve plunger 17 and is removed from the first valve seat 16 on the valve body 7. The other end of the input shaft 46 is mechanically coupled to a brake pedal, not shown.

A disengagement of the valve plunger 17 from the valve body 7 is prevented by the provision of a key member 48. The key member 48 is movable in the axial direction of the valve body 7, and when the brake booster 1 is inoperative, it abuts against the inner surface of the rear shell 3 to maintain the valve plunger 17 at an advanced position relative to the valve body 7, thus allowing a lost motion of the input shaft 46 at the commencement of operation of the brake booster 1 to be reduced.

A plate plunger 50 and a reaction disc 51 are sequentially disposed forwardly of the valve plunger 17. The plate plunger 50 is slidably fitted into a servo ratio regulating member 52 which is separately secured to the front end face of the valve body 7 while maintaining a hermetic seal. The reaction disc 51 is received within a recess formed in one end 53A of an output shaft 53 and the recess is fitted around the outer peripheral surface of the servo ratio regulating member 52 while the distal end of the output shaft 53 is mechanically coupled to a piston of a master cylinder, not shown.

Accordingly, a brake reaction which is transmitted from the piston of the master cylinder is transmitted through the output shaft 53 to the reaction disc 51, and thence transmitted through the servo ratio regulating member 52 to be accepted by the valve body 7 and is also transmitted through the plate plunger 50, the valve plunger 17 and the input shaft 46 to a driver.

The valve body 7 and the power pistons 10 and 11 are normally maintained in their inoperative positions shown by a return spring 54 which is disposed between the front shell 2 and the valve body 7. Under the inoperative condition, a clearance is formed between the plate plunger 50 and the reaction disc 51, whereby at the commencement of operation of the brake booster, an output rises without any brake reaction (jumping) until the reaction disc 51 moves into contact with the plate plunger 50.

The servo ratio regulating member 52 will now be described more specifically. The servo ratio regulating member 52 comprises an engaging portion 52A of a reduced diameter which is engaged, as a press fit, into a portion 7B of the valve body 7 which serves as an engaging portion, and an abutment portion 52B of an increased diameter which is located forwardly of the engaging portion 52A. A step is formed between the abutment portion 52B and the engaging portion 52A and is disposed in abutment against a step formed between the portion 7B of a reduced diameter and a portion 7C of an intermediate diameter of the valve body 7 for allowing the brake reaction which is transmitted to the servo ratio regulating member 52 to be accepted by the valve body 7.

The engaging portion 52A of the servo ratio regulating member 52 is tapered (at an angle of about 2°) so that its diameter gradually increases in the rearward direction. In a corresponding manner, the portion 7B of a reduced diameter of the valve body 7 is similarly tapered (at an angle of about 2°) so that its diameter gradually increases in the rearward direction. The tapered portions 7B and 52A are effective to prevent a withdrawal of the servo ratio regulating member 52 from the valve body 7. An O-ring 55 is fitted around the outer periphery of the engaging portion 52A and projects radially outward so as to maintain a hermetic seal between the valve body 7 and the servo ratio regulating member 52.

The abutment portion 52B has an external diameter D' which is greater than the internal diameter D of the tubular terminal portion 7A of the valve body 7 or the outer periphery of the rolling part 25 of the valve element 20 which is secured in place within the tubular terminal portion 7A. The reaction disc 51 which abuts against the abutment portion 52B is formed to a similar greater diameter, as is the recess 53A of the output shaft 53 which is fitted around the portion 52B of an increased diameter.

In a region where the abutment member 52B is positioned, the inner peripheral surface of the valve body 7 is defined as the portion 7C of an intermediate diameter which is circumferentially notched in conformity to the outer periphery of the constant pressure passage 33. The end 53A of the output shaft 53 is positioned intermediate the portion 7C of the intermediate diameter and the abutment portion 52B. The end 53A has its extremity folded radially outward, forming a given clearance between the folder and the portion 7C of an intermediate diameter to allow a smooth passage of a fluid therethrough.

It will be noted that a portion of the opening of the constant pressure passage 33, which is located radially inward, is blocked by the servo ratio regulating member 52, but the constant pressure passage 33 communicates with the constant pressure chamber A through an annular space which is formed between the portion 7C of an intermediate diameter and the abutment portion 52B and which continues circumferentially, whereby there is no substantial reduction in the flow rate which might occur as a result of forming the servo ratio regulating member 52 to a larger diameter than the inside of the constant pressure passage 33.

The valve body is also formed with a portion 7D which continues from the portion 7C of an intermediate diameter and which is of a greater diameter than the portion 7C. A retainer 56 which is L-shaped in section is disposed in the portion 7D and has a front end face which is abutted by an end of the return spring 54. The end 53A of the output shaft 53 is loosely fitted through the retainer 56, allowing a fluid to pass through a clearance left between the end 53A of the output shaft 53 and the retainer 56.

The constant pressure passage 34 communicates with the constant pressure passage 33, and also directly communicates with the constant pressure chamber A through a notch 7E formed in the internal peripheral surface of the valve body 7 and extending axially forward.

With the described construction of the booster having the servo ratio regulating member 52 which is separate from the valve body 7, it is possible to choose an external diameter D" of the reaction disc 51 which is disposed for abutment against the servo ratio regulating member 52 to be greater than the external diameter D of the outer periphery of the valve element 20. Accordingly, it is possible to increase the proportion of the brake reaction which is transmitted from the reaction disc 51 to the valve body 7 while reducing the proportion of the brake reaction which is transmitted from the reaction disc 51 through the plate plunger 50, the valve plunger 17 and the input shaft 46 to a driver.

Figure 5:
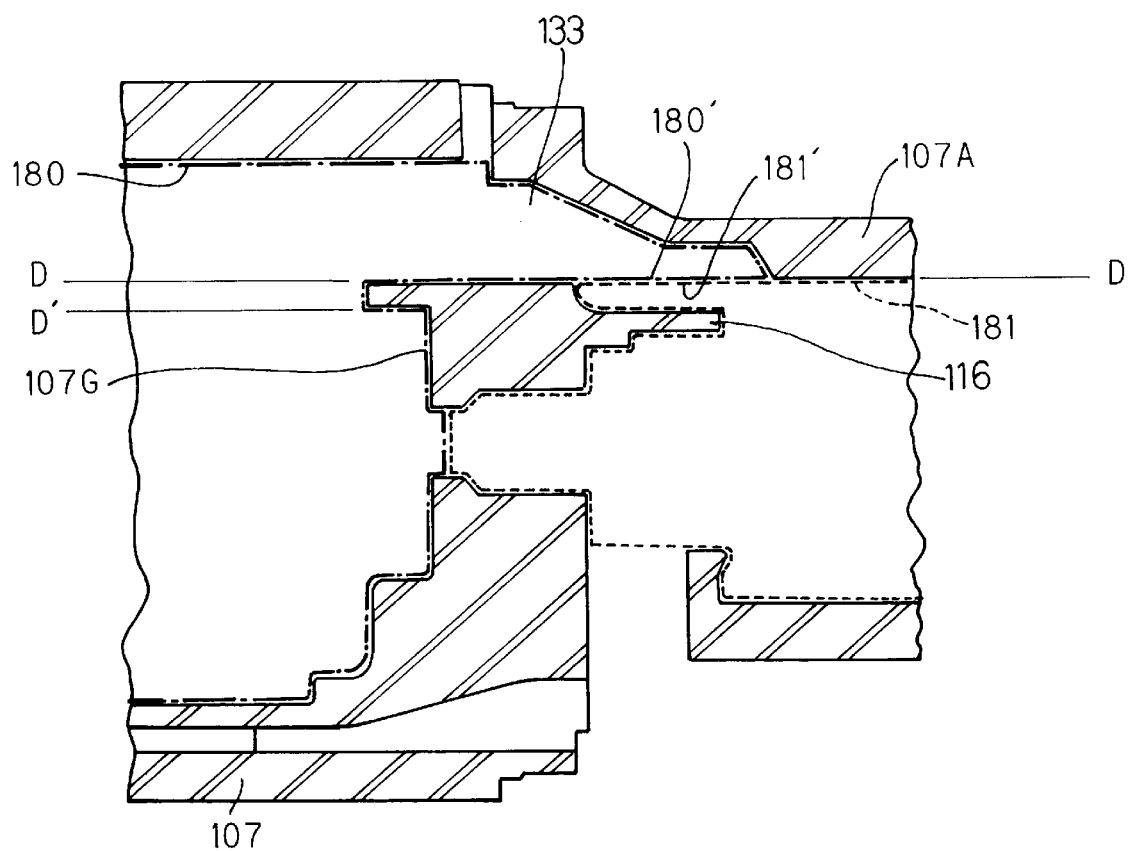
FIG. 5 is a cross section illustrating a method of manufacturing a valve body 107.

As compared with this construction of the present embodiment, in the prior art construction shown in FIG. 5 which is not provided with the servo ratio regulating member 52, it has been impossible to choose an external diameter D' of an abutment portion of a valve body which is disposed for abutment against a reaction disc to be greater than the external diameter D of the outer periphery of the valve element. Accordingly, a brake reaction which is transmitted to a driver had to be reduced by using an electromagnet, for example. Accordingly, it has been pointed out that the arrangement is complex and expensive.

In the embodiment described above, the O-ring has been provided on the servo ratio regulating member 52, but the invention is not limited to the use of such an O-ring, and where the servo ratio regulating member 52 is formed of a resin material, an annular seal which bulges circumferentially may be directed provided on the engaging portion for purpose of a sealing function.

While the invention has been described above in connection with a preferred embodiment thereof, it should be understood that a number of changes, modifications and substitutions therein are possible from the above disclosure without departing from the spirit and the scope of the invention defined by the appended claims.

What is claimed is:

1. A brake booster comprising a substantially tubular valve body slidably disposed in a shell, a power piston mounted on the valve body to divide the interior of the shell into a constant pressure chamber and a variable pressure chamber, a valve plunger slidably mounted on the valve body and driven by an input shaft to move back and forth to switchably control a flow path, an output shaft slidably mounted on the valve body and driven back and forth in interlocked relationship with the valve body, a reaction disc disposed between the output shaft and the valve body for transmitting a brake reaction from the output shaft to the valve body and the valve plunger, and a valve mechanism comprising an annular, first valve seat formed on the valve body, a second valve seat formed on the rear end of the valve plunger, and a valve element disposed within the valve body and adapted to be seated on the first and second valve seats:

characterized in that a servo ratio regulating member is disposed on the front end face of the valve body and projects axially forward to abut against the rear end face of the reaction disc and the external diameters of the surface of the servo ratio regulating member that abuts against the reaction disc and the reaction disc are greater than the external diameter of a stem portion of the valve element clamped to an inner peripheral surface of the valve body.

2. A brake booster according to claim 1, in which a combination of the first valve seat and a first seat area on the valve element which moves into engagement or disengagement from the first valve seat defines an atmosphere valve while a combination of the second valve seat and a second seat area on the valve element which moves into engagement with or disengagement from the second valve seat defines a vacuum valve, which is spaced axially rearward of the atmosphere valve, the atmosphere valve and the vacuum valve having substantially equal diameters.

3. A brake booster according to claim 1, in which the servo ratio regulating member comprises an engaging portion of a reduced diameter located at a rear end of the regulating member and fitted into a mating portion of the valve body as a press fit, and an abutment portion of an increased diameter located at a front end of the regulating member for abutment against the reaction disc, the engaging portion of the servo ratio regulating member and the mating portion of the valve body being tapered such that the inner diameter of the valve body increases in the rearward direction.

4. A brake booster according to claim 3, further comprising an O-ring disposed around the outer periphery of the engaging portion of the servo ratio regulating member to maintain a hermetic seal between the valve body and the servo ratio regulating member.

5. A brake booster comprising a substantially tubular valve body slidably disposed in a shell, a power piston mounted on the valve body to divide the interior of the shell into a constant pressure chamber and a variable pressure chamber, a valve plunger slidably mounted on the valve body and driven by an input shaft to move back and forth to switchably control a flow path, an output shaft slidably mounted on the valve body and driven back and forth in interlocked relationship with the valve body, a reaction disc disposed between the output shaft and the valve body for transmitting a brake reaction from the output shaft to the valve body and the valve plunger, and a valve mechanism comprising an annular, first valve seat formed on the valve body, a second valve seat formed on the rear end of the valve plunger, and a valve element disposed within the valve body and adapted to be seated on the first and second valve seats:

characterized in that a servo ratio regulating member is disposed on the front end face of the valve body, abuts against a rear end face of the reaction disc and has a small diameter engagement portion pressure fitted into an engagement portion of the valve body and a front part formed with a large diameter abutting portion which abuts the reaction disc, the external diameters of the surface of the servo ratio regulating member that abuts against the reaction disc and the reaction disc being greater than the external diameter of a stem portion of the valve element clamped to an inner peripheral surface of the valve body.

6. A brake booster according to claim 5, wherein the engagement portions of the servo ratio regulating member and valve body are tapered in shape.

7. A brake booster according to claim 6, further comprising an O-ring disposed around the outer periphery of the engagement portion of the servo ratio regulating member to provide a hermetic seal between the valve body and the servo ratio regulating member.

8. A brake booster according to claim 7, in which a combination of the first valve seat and a first seat area on the valve element which moves into engagement or disengagement from the first valve seat defines an atmosphere valve while a combination of the second valve seat and a seat area on the valve element which moves into engagement with or disengagement from the second valve seat defines a vacuum valve which is axially rearward of the atmosphere valve, the atmosphere valve and the vacuum valve having substantially equal diameters.

9. A brake booster according to claim 6, in which a combination of the first valve seat and a first seat area on the valve element which moves into engagement or disengagement from the first valve seat defines an atmosphere valve while a combination of the second valve seat and a seat area on the valve element which moves into engagement with or disengagement from the second valve seat defines a vacuum valve which is axially rearward of the atmosphere valve, the atmosphere valve and the vacuum valve having substantially equal diameters.

10. A brake booster according to claim 5, further comprising an O-ring disposed around the outer periphery of the engagement portion of the servo ratio regulating member to provide a hermetic seal between the valve body and the servo ratio regulating member.

11. A brake booster according to claim 10, in which a combination of the first valve seat and a first seat area on the valve element which moves into engagement or disengagement from the first valve seat defines an atmosphere valve while a combination of the second valve seat and a seat area on the valve element which moves into engagement with or disengagement from the second valve seat defines a vacuum valve which is axially rearward of the atmosphere valve, the atmosphere valve and the vacuum valve having substantially equal diameters.

12. A brake booster according to claim 5, in which a combination of the first valve seat and a first seat area on the valve element which moves into engagement or disengagement from the first valve seat defines an atmosphere valve while a combination of the second valve seat and a seat area on the valve element which moves into engagement with or disengagement from the second valve seat defines a vacuum valve which is axially rearward of the atmosphere valve, the atmosphere valve and the vacuum valve having substantially equal diameters.

\* \* \* \* \*